E. E. NORRIS.
SECURING DEVICE.
APPLICATION FILED DEC. 18, 1912.
1,064,527.
Patented June 10, 1913.
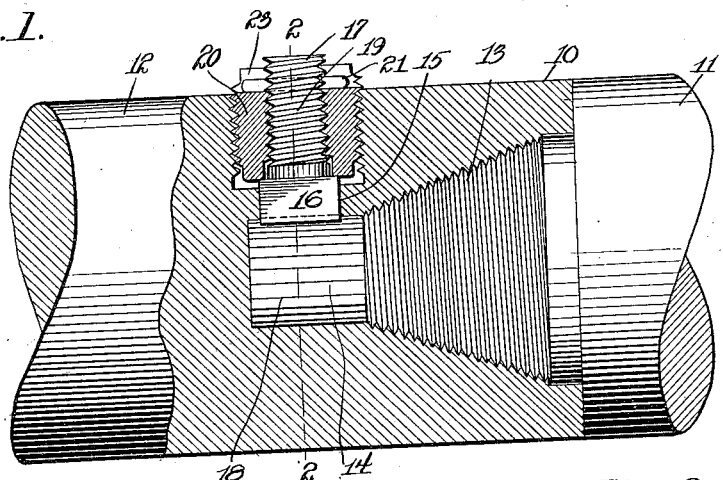
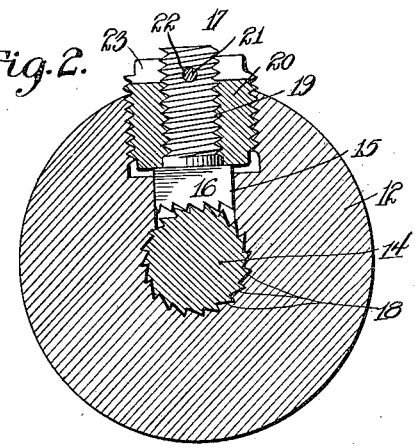
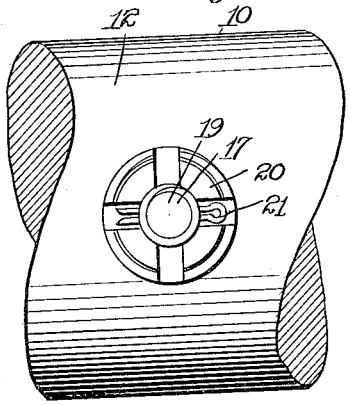
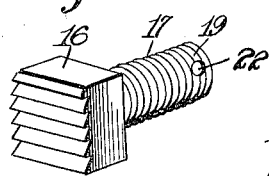
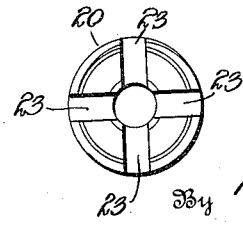
Inventor
Everett Edward Norris
Witnesses
Wm H. Mulligan
P. H. Hosler
By Victor J. Evans
Attorney

UNITED STATES PATENT OFFICE.

EVERETT EDWARD NORRIS, OF BRECKENRIDGE, COLORADO.

SECURING DEVICE.

1,064,527.  Specification of Letters Patent.  Patented June 10, 1913.

Application filed December 18, 1912. Serial No. 737,489.

*To all whom it may concern:*

Be it known that I, EVERETT EDWARD NORRIS, a citizen of the United States, residing at Breckenridge, in the county of Summit and State of Colorado, have invented new and useful Improvements in Securing Devices, of which the following is a specification.

An object of the invention is to provide a device for securing component parts of structures in locked or connected relation.

The invention embodies, among other features, a device preferably for use in connection with the connectible parts of tools or on shafting, and includes a structure that is adapted to take the place of the usual set screw employed for securing collars to shafting.

My invention is particularly adaptable for use in connection with well drilling tools and wherein it is desired to connect one portion of the tool to the other in a manner which will prevent the accidental separation of the component parts of the tool.

In the further disclosure of the invention reference is to be had to the accompanying drawings, constituting a part of this specification, in which similar characters of reference denote corresponding parts in all the views, and in which:

Figure 1 is a fragmentary vertical sectional view of a well drilling tool showing my device applied thereto to retain the connectible parts of the tool in locked position; Fig. 2 is a horizontal sectional view taken on the line 2—2 in Fig. 1; Fig. 3 is a perspective view of the gripping member and shank; Fig. 4 is a perspective view of the plug; Fig. 5 is an end view of the plug; and Fig. 6 is a fragmentary side elevation of the tool disclosed in Fig. 1 and showing the manner of locking the gripping member with respect to the plug.

Referring more particularly to the views, I disclose a well drilling tool 10 consisting of connectible sections 11 and 12, the section 11 being preferably provided with a tapered threaded head 13 having an integral member 14 formed on the free end thereof, the said head being adapted for threaded engagement with the section 12 so that the member 14 will lie in the plane of a transverse opening 15 formed in the section 12. The inner end of the opening 15 is squared in order to receive therein a toothed gripping head 16 of a gripping member 17, the teeth of the said gripping head being adapted to engage and abut against the member 14, which is preferably provided with teeth 18 which mesh with the teeth of the gripping head 16 to prevent rotation of the member 14, and, consequently, the head 13, with respect to the section 12. The gripping member 17 includes, with the head 16, an integral threaded shank 19 which extends longitudinally through the opening 15 and exteriorly thereof, a tubular plug 20 interiorly and exteriorly threaded, being adapted for threaded engagement with the shank 19 and with the section 12, as shown, it being understood, however, that the interior threads on the plug are of greater number to the inch than the exterior threads thereof so that at the moment the plug is engaged with the shank 19 and with the section 12 and screwed up thereon, a pressure will be exerted against the gripping head 16 to immediately force the same into gripping engagement with the teeth of the member 14.

When the plug 20 has been screwed up on the shank 19 and extends within the opening 15 of the section 12, it will be seen that the free end of the shank 19 will extend beyond the outer end of the plug and a suitable cotter pin 21 is then passed through an opening 22 in the shank 19, with the ends of the cotter pin extending into recesses cut into the outer face or end of the plug 20, thus locking the shank 19 relatively to the plug. It will now be seen that by providing a construction of this kind, the sections 11 and 12 will be held in rigid and locked engagement and will be prevented from accidentally working apart or becoming separated while the tool 10 is in use.

Although I have described my device as used in connection with a well drilling tool, it will be understood that the same can be employed for securing tools or collars on shafting, the arrangement of the device, when applied to the tool or collar, being substantially the same as the application of the device to the section 12 in order to rigidly lock the section 11 thereto. It should be noted that by having the interior threads on the plug 20 of greater number to the inch than the exterior threads thereof, and consequently having the threads on the shank 19 of the same number per inch as the interior threads on the plug, the gripping member 17 will be advanced to move the teeth of the head thereof into gripping engagement with the teeth of the member 14 when the plug 20 is arranged in threaded engagement with the shank 19 and applied to the section 12 as shown, any rotation of the gripping head 16 being prevented by having the inner end of the opening 15 squared in order to receive the head and which is preferably made rectangular, as mentioned heretofore. Therefore, from the foregoing description it will be apparent that the device described is simple and durable in construction and consists substantially of only two parts, namely, the gripping member 17 and the plug 20, it being understood that the cotter pin 21 for locking the shank 19 with respect to the plug 20 can be dispensed with and is only employed to more securely perform the locking operation.

Having thus described my invention, I claim:

1. In a device for relatively locking a plurality of connectible members, a gripping member carried by one of the members and adapted to grip the other member, and a plug for threaded connection with the gripping member and with the first member for securing the gripping member in gripping engagement with the second member.

2. In a device for relatively locking a plurality of connectible members, a gripping member carried by one of the members, a plug for threaded connection with the gripping member and with the first member for securing the gripping member in gripping engagement with the second member, and means for relatively locking the gripping member with respect to the said plug.

3. In a securing device, the combination with a gripping member comprising a gripping head and an integral threaded shank, of a tubular plug interiorly and exteriorly threaded, with the interior threads of the plug adapted for threaded connection with the shank of the gripping member and the exterior threads of the plug adapted for threaded connection with an object adapted to be retained in locked engagement with another object engaged by the head of the gripping member.

4. In a securing device, the combination with a gripping member comprising a gripping head and an integral threaded shank, of a tubular plug interiorly and exteriorly threaded, with the interior threads of the plug adapted for threaded connection with the shank of the gripping member and the exterior threads of the plug adapted for threaded connection with an object adapted to be retained in locked engagement with another object engaged by the head of the gripping member, and a cotter pin adapted to extend transversely through the free end of the said shank, with the ends of the cotter pin extending into recesses formed in the said plug to lock the said shank against rotation relatively to the plug.

5. In a securing device, the combination with a gripping member, of threads thereon, a plug for threaded connection with the gripping member, and threads formed on the peripheral surface of the plug, with the threads on the said gripping member being greater in number per standard unit than the threads on the peripheral surface of the plug.

In testimony whereof I affix my signature in presence of two witnesses.

EVERETT EDWARD NORRIS.

Witnesses:
CRAIG RHOADS,
TOWNSEND NORRIS.

Copies of this patent may be obtained for five cents each, by addressing the "Commissioner of Patents, Washington, D. C."